United States Patent [19]
Rempinski et al.

[11] Patent Number: 5,110,093
[45] Date of Patent: May 5, 1992

[54] SHEAVE PLATE AND CABLE ASSEMBLY FOR A TIRE LIFT/CARRIER WINCH

[75] Inventors: Donald R. Rempinski, Grand Haven; Donald R. Britt, Grand Rapids, both of Mich.

[73] Assignee: Sparton Corporation, Jackson, Mich.

[21] Appl. No.: 453,009

[22] Filed: Dec. 20, 1989

Related U.S. Application Data

[63] Continuation of Ser. No. 170,281, Mar. 18, 1988, abandoned.

[51] Int. Cl.$^5$ .............................................. B66D 1/00
[52] U.S. Cl. .................................... 254/266; 254/323; 254/DIG. 14
[58] Field of Search ............... 254/323, DIG. 14, 266; 64/113; 29/33 A

[56] References Cited

U.S. PATENT DOCUMENTS

| | | | |
|---|---|---|---|
| 4,059,197 | 11/1977 | Iida | 414/451 |
| 4,166,311 | 9/1979 | Lindstrand | 29/33 A |
| 4,535,973 | 8/1985 | Dorr et al. | 254/323 |
| 4,544,136 | 10/1985 | Denman et al. | 254/323 |
| 4,625,947 | 12/1986 | Denman et al. | 254/323 |

FOREIGN PATENT DOCUMENTS 0316977 7/1929 United Kingdom .

Primary Examiner—Katherine Matecki
Attorney, Agent, or Firm—Reising, Ethington, Barnard, Perry & Milton

[57] ABSTRACT

A sheave plate and cable assembly for a tire lift/carrier winch comprises a sheave plate having spaced apart side faces defining a plate thickness therebetween and having an outer peripheral edge interconnecting the side faces and including an arcuate cable-wrapping track thereon. The end of a cable extends into the sheave plate between the side faces and is captured therein by the sheave plate which is die cast therearound. A portion of the cable end extends into the sheave plate in arcuate manner about the axis of rotation of the sheave plate and terminates in a flattened head portion. The thickness of the captured cable end is less than the plate thickness whereby the cable end is confined between the side faces of the sheave plate and does not extend beyond the side faces into adjacent side plates of the sheave assembly.

40 Claims, 3 Drawing Sheets

SHEAVE PLATE AND CABLE ASSEMBLY FOR A TIRE LIFT/CARRIER WINCH

This is a continuation of copending application(s) Ser. No. 170,281 filed on Mar. 18, 1988, now abandoned.

FIELD OF THE INVENTION

The invention relates to a winch especially useful for a tire lift/carrier and, in particular, to a unitary sheave plate and cable assembly for use in a sheave assembly of such a winch. A method for making the sheave plate and cable assembly is also disclosed.

BACKGROUND OF THE INVENTION

Vehicle tire lift/carrier winch mechanisms have been used in the past to store a spare tire beneath a vehicle such as an automobile, truck and the like.

U.S. Pat. No. 4,059,197 issued Nov. 22, 1977, to Iida, U.S. Pat. No. 4,535,973 issued Aug. 20, 1985 to Dorr et al, U.S. Pat. No. 4,544,136 issued Oct. 1, 1985 to Denman et al and U.S. Pat. No. 4,625,947 issued Dec. 2, 1986, to Denman et al disclose winch mechanisms for tire lift/carriers wherein an eccentric gear arrangement is employed to provide a mechanical advantage in driving the sheave assembly of the winch in rotation to wind or unwind the cable connected to the spare tire carrier frame.

In these patented winch mechanisms, the sheave assembly typically includes a pair of sheave side plates maintained in spaced apart relation by suitable fasteners such as rivets and a rotatable sheave center plate having a peripheral edge forming a cable-wrapping track on which the cable is wrapped or unwrapped depending upon the direction of rotation of the sheave assembly. The spacing between the sheave side plates is selected to cause the cable to wind or wrap on itself as the sheave assembly is rotated.

The winch cable typically is attached to the sheave assembly by affixing an enlarged cylindrical sleeve member onto the cable end and forming side-by-side apertures in the sheave side plates and the sheave center plate to receive the enlarged sleeve member affixed on the cable end. In particular, the enlarged sleeve is dimensioned to extend into apertures in the sheave side plates and to ride on rims of the side plates defining the apertures therein as the sheave assembly is rotated British Patent 316,977 illustrates a spring biased drum and cable assembly attachable to a towing vehicle to maintain a cable extending from the towing vehicle to a towed vehicle taut at all times. The drum includes a spiral groove in which one end of the cable is received and is secured to the drum by welding, riveting or wedging.

SUMMARY OF THE INVENTION

The invention contemplates a sheave plate and cable assembly for a winch, such as a tire lift/carrier winch, wherein the sheave plate includes an outer peripheral edge having an arcuate cable-wrapping track thereon and wherein an end of the cable extends into the sheave plate through the peripheral edge and is captured in the sheave plate by a portion of the sheave plate molded, such as die cast, therearound. A unitary sheave-plate and cable assembly is thereby provided for a winch.

The invention also contemplates a sheave and cable assembly of the preceding paragraph wherein the thickness of the captured cable end no greater than the thickness of the sheave plate such that the cable does not protrude beyond side faces of the sheave plate.

The invention further contemplates a sheave plate having a specially configured internal passage and internal cavity to receive and capture complementary configured portions of the end of the winch cable.

The invention further contemplates a winch sheave assembly having a pair of sheave side plates with the unitary sheave plate and cable assembly disposed therebetween.

The invention still further contemplates a method for making a sheave plate and cable assembly by molding, such as die casting, the sheave plate around the cable end to integrally capture same.

In a typical working embodiment of the invention, the sheave plate and cable assembly comprises a die cast metal sheave plate having spaced apart side faces defining a plate thickness therebetween and having an outer peripheral edge interconnecting the side faces and including an arcuate, cable-wrapping track thereon. The sheave and cable assembly further comprises a metal cable having a cable end extending into the sheave plate through a cable entrance slot in the peripheral edge and captured in the sheave plate by the sheave plate die cast around the cable end. The cable end extends between the side faces of the sheave plate and its thickness is less than the thickness of the sheave plate whereby the cable end does not extend beyond the side faces and is spaced form adjacent sheave side plates when assembled therewith to form a sheave assembly.

The cable end preferably includes an arcuate, kinked portion extending about the axis of rotation of the sheave plate and terminating in an elongate head portion having a flattened configuration adapted to be trapped in a shallow cavity in the sheave plate when the sheave plate is die cast around the cable end. The arcuate portion of the cable preferably has a circular cross-section while the elongate, flattened head portion preferably has an oval cross-section whose thickness is less than the diameter of the arcuate portion. The arcuate portion and flattened head portion of the cable end thereby form shoulders at their junction. Complementary restraining shoulders are formed in the sheave plate in opposing relation to the shoulders on the cable end to anchor the cable end in the sheave plate against pull-out forces when the cable is under tension.

BEST MODE OF PRACTICING THE INVENTION

Figure 1:
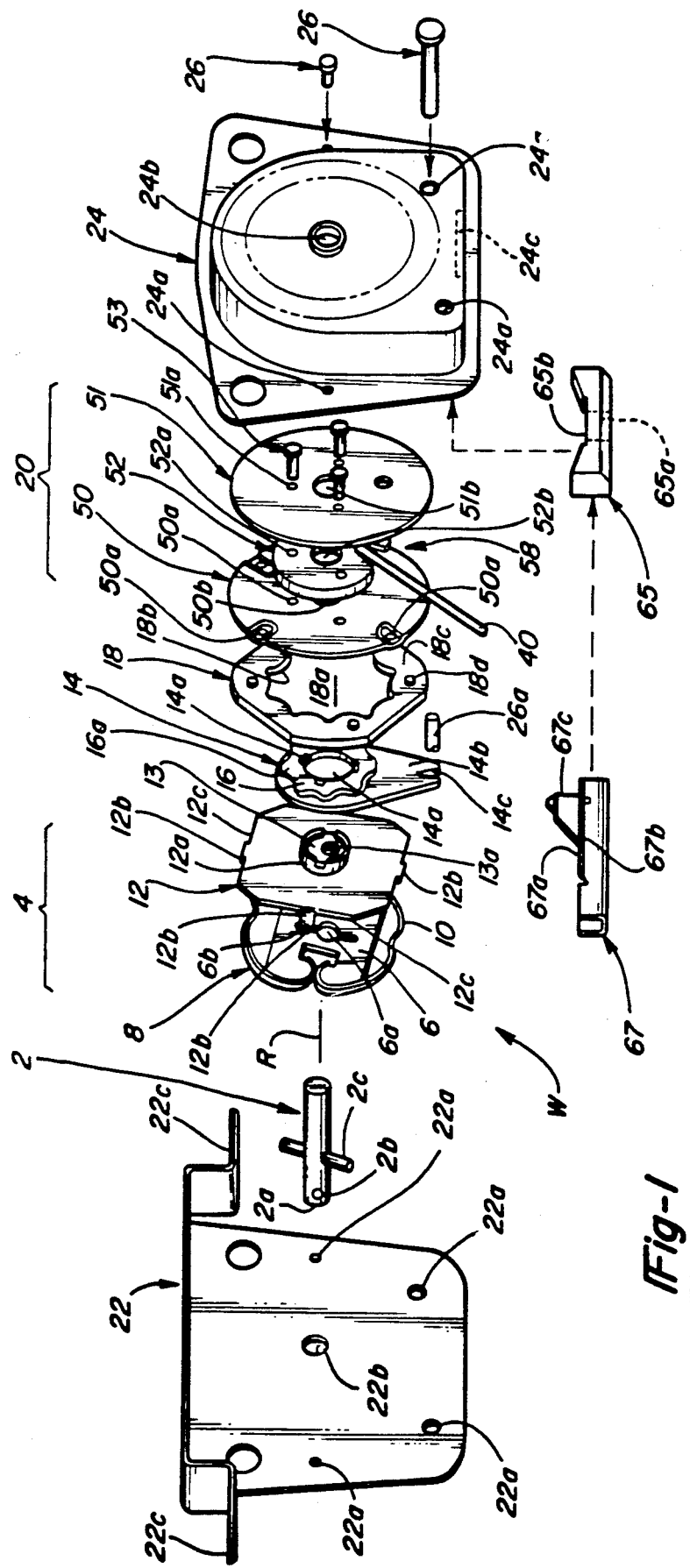
FIG. 1 is an exploded view of a tire lift/carrier winch in accordance with the invention.

Referring to FIG. 1, a tire lift/carrier winch W is shown including a drive shaft 2, a torque limiting assembly 4 having a spring plate 6 with springs 8,10 thereon and an eccentric plate 12 adjacent the spring plate, an eccentric cam 13, a torque arm 14 with a driving gear 16 attached thereon by bent tabs 14a of the torque arm, an annular driven gear 18 and a sheave assembly 20. These winch components are disposed in operative side-by-side relation on the drive shaft 2 between the opposing housing plates 22,24 that are connected together by suitable means, such as rivets 26, to enclose the winch components. Each housing plate 22,24 includes rivet-receiving holes 22a,24a to this end.

Each housing plate 22,24 includes respective coaxial apertures 22b,24b to rotatably receive the opposite ends of the drive shaft 2 in a manner known in the art. One end 2a of the drive shaft 2 extends outside the housing plate 22 when the winch components are assembled and includes a cross bore 2b by which the drive shaft 2 can be rotated to lift or lower a vehicle tire carrier (not shown).

The drive shaft 2 extends through an opening 6a in the spring plate 6 and includes a diametral pin 2c received in driving relation in the cross slot 6b of the spring plate. The drive shaft 2 also extends through the opening 13a of the eccentric cam 13, which is press fit, keyed or other secured on the drive shaft 2 for rotation therewith.

The eccentric plate 12 includes a hub 12a extending axially toward the torque arm 14. The hub 12a receives and is keyed to the eccentric cam 13. The torque arm 14 includes an opening 14d receiving the hub 12a and the eccentric cam 13 therein and includes an extension 14b having an elongate slot 14c. The elongate slot 14c receives the intermediate shaft 26a of one of the rivets 26 holding the housing plates 22,24 together. The slotted extension 14b and intermediate shaft 26a of the rivet cooperate to impart oscillatory motion to the torque arm 14 and driving gear 16 thereon in known manner when the drive shaft 2 is rotated.

The annular driven gear 18 includes a central opening 18a receiving the driving gear 16 attached on the torque arm 14 and includes multiple inner teeth 18b that mesh with the outer teeth 16b of the driving gear 16. The driven gear 18 includes side face 18c facing the side plate 50 of the sheave assembly 20. The side face 18c of the driven gear includes a plurality of integrally formed studs 18d extending parallel to one another and to the axis of rotation R of the drive shaft 2.

The studs 18d are received in press fit in a respective coaxially aligned hole 50a formed in the side plate 50 in order to drive the sheave assembly 20 in rotation about axis R.

The sheave assembly 20 includes the side plate 50, another side plate 51 spaced therefrom and the center plate and cable assembly 58 of the invention disposed between the side plates 50,51. The assembly 58 includes a sheave center plate 52 and a cable 40 integrally attached thereto as will be explained hereinbelow.

The sheave side plates 50,51 and sheave center plate 52 are joined together to form the sheave assembly 20 by three rivets 53 extending through aligned holes 50a,51a,52a in the respective sheave plates 50,51,52. Sheave plates 50,51,52 include a respective central opening 50b,51b,52b through which the drive shaft 2 extends. The sheave plates 50,51,52 are in bearing relation on the drive shaft 2.

In the winch shown in FIG. 1, rotation of the drive shaft 2 causes oscillation of the driving gear 16 as controlled by reciprocation of slotted extension 14b of the torque arm 14 relative to the intermediate rivet shaft 26a and a corresponding driving of the annular driven gear 18 in rotation about axis R. The annular driven gear 18 in turn drives the sheave assembly 20 in rotation through studs 18d press fit in holes 50a in the sheave side plate 50 to wind the cable 40 on the center sheave plate 52 when the sheave assembly 20 is rotated clockwise and to unwind the cable when the sheave assembly is rotated counterclockwise. This type of gear train and its operation are shown in the aforementioned U.S. Pat. No. 4,059,197 and U.S. Pat. No. 4,544,136, the teachings of which are incorporated by reference.

A cable guide member 65 is disposed in the housing plates 22,24 when the winch components are assembled. In particular, the cable guide 65 includes a slot 65a aligned with a slot 24c in the bottom wall of the housing plate 24. The cable 40 extends through these slots outside the housing toward the vehicle spare tire carrier (not shown).

An anti-reverse pawl 67 is also provided in the winch construction and includes a forked arm 67a with a slot 67b. The forked arm overlies flat surface 65b on the guide member 65 such that the slot 67b straddles the slot 65a. The cable 40 passes through the slot 67b as it exits or enters the winch W through the aforementioned slots 24c,65a. The pawl 67 also includes a pawl arm 67c which is adapted to engage the axially extending ears 12b on the eccentric plate 12 to prevent excessive rotation of the sheave assembly 20 in the unwind direction (counterclockwise rotation) and to prevent rewinding of the sheave assembly 20 in the wrong direction is fully explained in U.S. Pat. No. 4,535,973, the teachings of which are incorporated herein by reference. The ears 12b are centered on each of the four straight sides 12c of the eccentric plate 12.

The torque limiting assembly 4 allows the drive shaft 2 to free wheel in the event the cable 40 is subjected to an overload situation, such as in the event the tire lift-/carrier has been fully lifted to it final position or obstructed in its movement for some reason. In particular, the drive shaft 2 is keyed to the spring plate 6 by the diametral pin 2c on the drive shaft. When an overload condition exists, the springs 8,10 deflect past the ears 12b on the eccentric plate 12 to permit free wheeling of the drive shaft 2. Allowing the drive shaft 2 to free wheel in such situations protects the other components of the winch from damage. Operation of such a torque limiting assembly is known in the art; e.g., as explained in U.S. Pat. No. 4,544,136.

The winch W is attached to the bottom of a vehicle by attachment flanges 22c on the housing 22 and by suitable fasteners (not shown) extending through holes provided in the flanges 22c.

In accordance with the invention, the cable 40 is integrally attached to the center sheave plate 52 to form the sheave plate and cable assembly 58. Preferably, the cable 40 comprises what is known as "aircraft cable" which includes multiple strands of zinc coated carbon steel wire formed into a wire cable of generally circular cross-section. However the invention is not limited to "aircraft cable" and other types of cable, either multi-strand or single strand, can be used in the invention.

Referring to FIGS. 2-5, the sheave center plate 52 includes substantially parallel side faces 60 and an outer peripheral edge 62 interconnecting the side faces 60. The aforementioned holes 52a are provided through the side faces 60 to receive the rivets 53 and the opening 52b is provided through the side faces 60 to receive the drive shaft 2 in bearing relation.

The outer peripheral edge 62 of the center sheave plate 60 includes an arcuate cable-wrapping track 64 along a majority of its length. The cable-wrapping track 64 includes a planar portion 66 and a constant radius portion 68. It is apparent that the planar portion 66 intersects an arcuate transition portion 69 which blends with the constant radius portion 68. The cable-wrapping track 64 of the sheave center plate 52 is disposed between the sheave side plates 50,51 which are provided with larger diameters than the sheave center plate 52 to form a narrow channel around the cable-wrapping track 64 when the winch components are assembled in operative side-by-side relation to force the cable 40 to wrap initially on the cable-wrapping track 64 and then on itself as the sheave assembly 20 is rotated about axis R.

Figure 2:
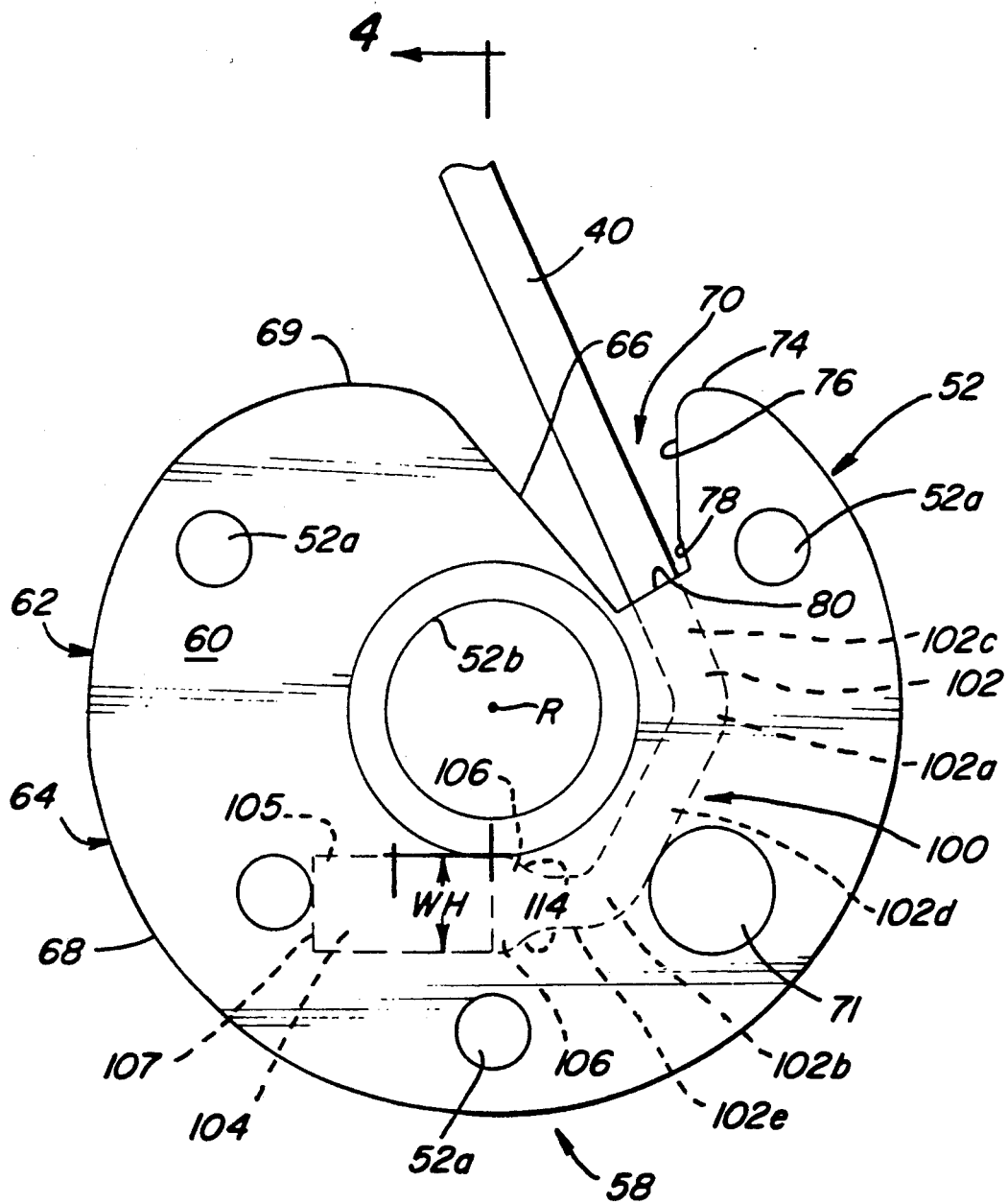
FIG. 2 is a side elevational view of the unitary sheave plate and cable assembly of the invention.
Figure 3:
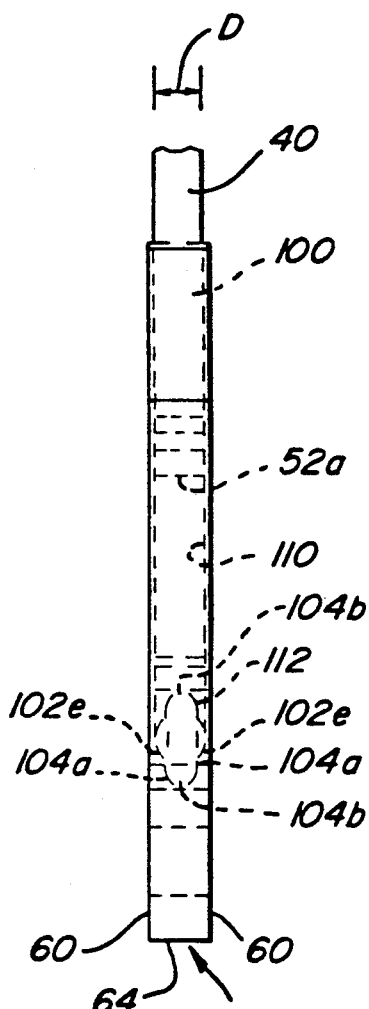
FIG. 3 is an edge elevational view of the sheave plate and cable assembly of FIG. 1.
Figure 4:
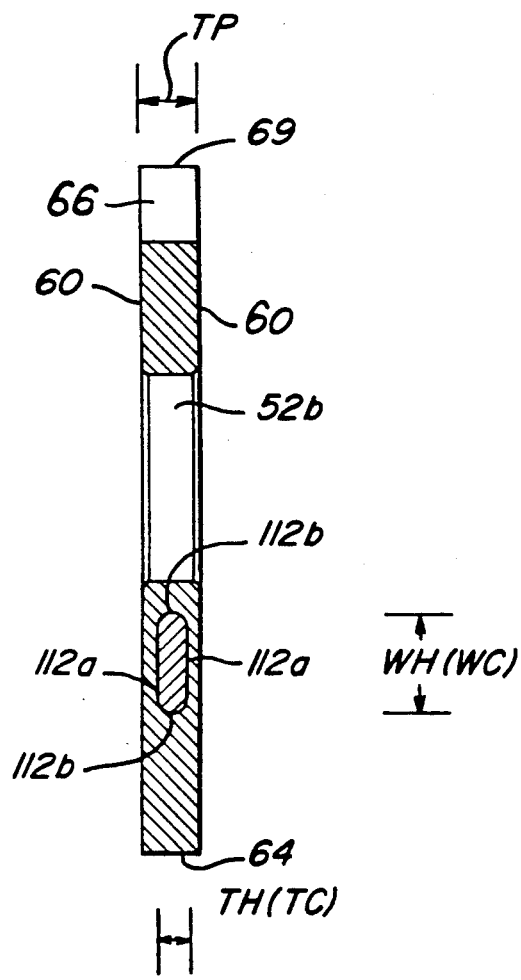
FIG. 4 is a sectional view taken along lines 4—4 of FIG. 2.

The planar portion 66 forms one side of a cable entrance slot 70 that interrupts the length of cable-wrapping track 64 as shown in FIG. 2. The other side of the cable entrance slot 70 is formed by a sharp radius portion 74 and planar portions 76 and 78 of the outer peripheral edge. The inner end of the slot 70 is formed by a planar end wall portion 80 of the outer peripheral wall.

As shown best in FIG. 2, the cable 40 includes cable end 100 which extends into the sheave plate 52 transversely through the end wall portion 80 of the cable entrance slot 70. The cable end 100 includes an arcuate, kinked portion 102 extending about the axis of rotation R of the sheave plate 52 and terminating in an elongate, flattened head portion 104 having an oval cross-section. The arcuate, kinked portion 102 of the cable end 100 is permanently kinked at 102a and 102b to form linearly extending portions 102c,102d,102e on the cable end 100 for reasons to be explained hereinbelow.

The oval cross-section of the head portion 104 of the cable end 100 includes a thickness dimension TH (defined between planar surfaces 104a) which is less than the diameter D of the arcuate cable portion 102 and a width dimension WH (defined between arcuate side surfaces 104b) which is greater than the diameter D of the arcuate portion 102. As a result, converging, restrained shoulders 106 are formed at the junction of the arcuate portion 102 and head portion 104 of the cable end 100. The flattened, oval head portion 104 of the cable end is formed on the cable end 100 by plastically deforming the cable end between opposing dies (not shown) of a hydraulic press (not shown) until the desired oval shape is obtained. Of course, other forming techniques may be used to provide the flattened head portion 104 on the cable end 100.

The spacing between side faces 60 of the sheave plate 52 defines a plate thickness TP. The diameter D of the arcuate portion 102 and thickness TH of the head portion 104 of the cable end 100 are selected to be no greater than the thickness TP of the sheave plate 52. Preferably, the diameter D of the arcuate portion 102 and thickness TH of the head portion 104 are less than the thickness TP of the sheave plate 52 to encase the cable end 100 between the side faces 60 of the sheave plate 52 when the sheave plate is die cast therearound, see FIGS. 3-4, whereby the cable end does not protrude beyond the side faces 60.

The die cast sheave plate 52 includes an internal, arcuate passage 110 having a configuration complementary to that of the arcuate, kinked portion 102 of the cable end 100 by virtue of the sheave plate being molded therearound. Moreover, the die cast sheave plate 52 includes a shallow, elongate cavity 112 having a configuration complementary to that of the flattened head portion 104 for the same reason.

In particular, the arcuate, kinked passage 110 has a circular cross-section and extends about the axis of rotation R of the sheave plate 52. The shallow, elongate cavity 112 includes a rectangular profile when viewed in plan and an oval cross-section. The oval cross-section includes planar surfaces 112a that are substantially parallel to side faces 60 and define a cavity thickness dimension TC therebetween. Arcuate sides 112b of the oval cross-section define a cavity width dimension WC therebetween. The thickness dimension TC of the cavity 112 is less than the diameter of the passage 110 whereas the width dimension WC is greater than the diameter of the passage 110. As a result, converging, restraining shoulders 114 are formed in the sheave plate 52 at the junction of the passage 110 and cavity 112.

It is apparent the restraining shoulders 114 formed in the sheave plate are in opposing, abutting relation to the shoulders 106 formed on the cable end 100 to restrain movement of the shoulders 106 and thus the head portion 104 of the cable end 100 in an axial pull-out direction when the cable 40 is under tension.

It is also apparent that opposite end 107 of the cavity 112 is in opposing, abutting relation to the other end 105 of the head portion 104 to restrain movement thereof in the opposite direction. Furthermore, lateral movement of the head portion 104 is restrained by the adjacent lateral sides of the cavity 112 which abut thereagainst by virtue of being molded around and against the head portion 104 of the cable end.

Those skilled in the art will appreciate that the invention is not limited to the cross-sectional shapes shown for the arcuate, kinked portion 102 and the flattened head portion 104 of the cable end 100 and for the corresponding passage 110 and cavity 112 in the sheave plate 52. Other shapes for these features are possible within the scope of the invention.

Figure 5:
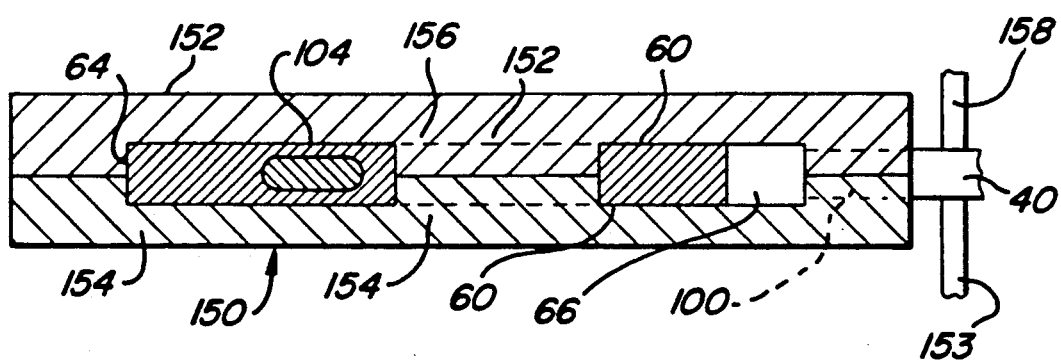
FIG. 5 is a sectional view through a die casting mold with the cable end disposed therein.

FIG. 5 illustrates schematically a die casting mold 150 having mold halves 152,154 which are configured to define a mold cavity 156 therebetween. The mold cavity 156 is contoured to provide the desired molded sheave plate shape when suitable molding material, such as molten zinc, is introduced and solidified therein. The cable end 100 is centered in the mold cavity 156 between mold halves 152,154 by clamps 158 disposed on the exterior of the mold cavity 156 and engaging the exposed cable 40. The kinks 102a,102b in the arcuate portion 102 of the cable end 100 are provided to establish and permanently maintain the desired arcuate configuration on the cable end 100 when it is disposed in the mold cavity 156. A pin (not shown) is inserted in the mold cavity 156 to form enlarged hole 71 through the sheave plate 52. This pin aids in locating the cable end 100 in the mold cavity 156. The hole 71 formed through the sheave plate 52 by die casting around the pin functions as an assembly guide pin hole during assembly of the winch components. Once the cable end 100 is properly positioned in the mold cavity 156, the molding material, such as molten zinc, is injected into the mold cavity 156 around the cable end and solidified therearound to integrally capture the cable end 100 in the die cast sheave plate 52. The die casting process is conducted in accordance with conventional zinc die casting procedures. Other molding processes are within the scope of the invention.

The thusly formed unitary sheave plate and cable assembly 58 is removed from the mold cavity 156 by opening the mold halves 152,154.

Preferably, the sheave plate 52 and cable end 100 are metallurgically bonded together during the die casting process to increase the pull-out force of the sheave plate and cable assembly 58; i.e., the force required to pull the cable end 100 out of the sheave plate 52. For example, when the sheave plate is formed by injecting molten zinc into the mold cavity 156 around the cable end 100 having zinc coated wires, metallurgical bonding is effected between the sheave plate 52 and the zinc coating on the wires of the cable 40 to increase the force required to pull the cable end 100 out of the sheave plate 52.

The sheave plate and cable assembly 58 is simple in construction, involves few components and is low in cost as compared to previous mechanical sheave assemblies which employed a separate sheave member swaged or otherwise fastened onto the end cable. Furthermore, since the captured cable end 100 does not protrude beyond side faces 60 of the sheave plate 52 and as a result is spaced from the sheave side plates 50,51, there is no need to provide apertures in the sheave side plates 50,51 to receive and retain the cable end 100 and no need to align those apertures in the sheave side plates as required in prior sheave constructions in order to receive the cable end. Assembly of the sheave plates is thus facilitated in the present invention.

In the preferred embodiment of the invention described hereinabove, the entire sheave plate 52 is illustrated as die cast around the cable end 100. However, the invention is not so limited and envisions molding a portion of the sheave plate 52 around the cable 100 in a mold cavity to capture same.

While the invention has been described in terms of specific embodiments thereof, it is not intended to be limited thereto but rather only to the extent set forth hereafter in the following claims.

I claim:

1. A sheave plate and cable assembly for a winch comprising (a) a sheave plate having an axis of rotation and an outer, peripheral edge including an arcuate, cable-wrapping track thereon, and (b) a cable having a cable end extending into the sheave plate through the peripheral edge and terminating in the sheave plate in a flattened head portion, said cable end being captured in the sheave plate by a portion of said sheave plate molded therearound, said cable being wrapped on said track when the sheave plate is rotated about its axis of rotation.

2. The assembly of claim 1 wherein the arcuate portion and flattened head portion of the cable end define a shoulder at their junction and said sheave plate includes an opposing, abutting restraining shoulder to restrain movement of the head portion from pull-out forces when the cable is under tension.

3. The assembly of claim 1 wherein the cable end has a substantially circular cross-section and the flattened head includes a substantially oval cross-section.

4. A sheave plate and cable assembly for a winch comprising (a) a sheave plate having an axis of rotation and an outer, peripheral edge including an arcuate, cable-wrapping track thereon, and (b) a cable having a cable end extending into the sheave plate through the peripheral edge and so integrally captured in the sheave plate by a portion of said sheave plate die cast therearound as to anchor the cable end in the sheave plate against pull-out forces when the cable is under tension, said cable being wrapped on said track when the sheave plate is rotated about its axis of rotation.

5. The assembly of claim 4 wherein the sheave plate and cable end are metallurgically bonded by virtue of said cable end including at least an outer portion made of a metal from which the sheave plate is die cast.

6. A sheave plate and cable assembly for a winch comprising (a) a sheave plate having an axis of rotation and an outer, peripheral edge including an arcuate, cable-wrapping track thereon said cable-wrapping tack extending along a majority of the length of said edge and including a cable entrance slot recessed inwardly of said track, and (b) a cable having a cable end extending into the sheave plate through said cable entrance slot and so integrally captured in the sheave plate by a portion of said sheave plate molded therearound as to anchor the cable end in the sheave plate against pull-out forces when the cable is under tension, said cable being wrapped on said track when the sheave plate is rotated about its axis of rotation.

7. A sheave plate and cable assembly for a winch comprising (a) a sheave plate having spaced apart side faces defining a plate thickness and having an outer peripheral edge interconnecting the side faces and including an arcuate, cable-wrapping track thereon, and (b) a cable having a cable end extending into the sheave plate between the side faces and captured in the sheave plate by a portion of said sheave plate molded therearound, the cable end having a thickness equal to or less than the plate thickness whereby the cable end does not protrude beyond the side faces of said sheave plate.

8. The assembly of claim 7 wherein the cable end includes an arcuate portion extending about an axis of rotation of the sheave plate.

9. The assembly of claim 8 wherein the arcuate portion includes kinks along its length.

10. The assembly of claim 8 wherein said arcuate portion has a circular cross-section whose diameter is less than the plate thickness.

11. The assembly of claim 10 wherein the arcuate portion terminates in a flattened head portion whose thickness is less than the plate thickness.

12. The assembly of claim 11 wherein the flattened head has an oval cross-section.

13. The assembly of claim 11 wherein the arcuate portion and flattened head portion of the cable end define a shoulder at their junction and said sheave plate includes an opposing, abutting restraining shoulder integral thereof to restrain movement of the head portion from pull-out forces when the cable is under tension.

14. A sheave plate and cable assembly for a winch comprising a die cast metal sheave plate having spaced apart side faces defining a plate thickness and an outer peripheral edge interconnecting the side faces and including an arcuate cable-wrapping track thereon, and a metal cable having a cable end extending into the sheave plate between the side faces and captured in the sheave plate by said sheave plate die cast therearound, the cable end having a thickness less than the plate thickness whereby the captured cable end is confined between the side faces of the sheave plate.

15. The assembly of claim 14 wherein the cable end includes an arcuate, kinked portion extending about an axis of rotation of the sheave plate.

16. The assembly of claim 15 wherein said arcuate portion has a circular cross-section whose diameter is less than the plate thickness.

17. The assembly of claim 16 wherein the arcuate portion terminates in a flattened head portion whose thickness is less than the plate thickness.

18. The assembly of claim 17 wherein the flattened head has an oval cross-section.

19. The assembly of claim 17 wherein the arcuate portion and flattened head portion of the cable end define a shoulder at their junction and said sheave plate includes an opposing, abutting restraining shoulder to restrain movement of the head portion from pull-out forces when the cable is under tension.

20. A molded sheave plate for a winch, comprising oppositely facing, spaced apart side faces, an outer peripheral edge interconnecting the side faces and including an arcuate cable-wrapping track thereon, and an internal passage extending arcuately from the outer peripheral edge through the sheave plate between the side faces and terminating in an internal elongate cavity between the side faces, said cavity and passage forming a cable restraining shoulder at their junction.

21. The sheave plate of claim 20 which is a die cast plate.

22. The sheave plate of claim 20 wherein the passage has a circular cross-section.

23. The sheave plate of claim 20 wherein the elongate cavity has an oval cross-section.

24. The sheave plate of claim 20 wherein the passage extends arcuately about the axis of rotation of the sheave plate.

25. The sheave plate of claim 24 wherein the passage includes kinks along its length.

26. The sheave plate of claim 20 wherein the outer peripheral edge includes the cable-wrapping track over the majority of its length and includes a cable entrance slot recessed inwardly of the cable wrapping track and terminating in an entrance wall.

27. The sheave plate of claim 26 wherein the arcuate passage intersects said entrance wall transverse thereto.

28. A sheave assembly useful for a tire lift/carrier winch and having an axis of rotation, comprising a first side plate, a second side plate spaced from the first side plate and a molded center plate disposed between said side plates in side-by-side relation, said center plate having spaced apart sides defining a plate thickness therebetween and having an outer peripheral edge interconnecting the sides and including an arcuate cable-wrapping track thereon disposed between the first side plate and second side plate, a cable having a cable end extending into the center plate between said sides and captured in the sheave plate by said sheave plate molded therearound, the cable end having a thickness less than the plate thickness whereby the captured cable end is confined between said sides and is spaced from said side plates.

29. The combination of claim 28 wherein the center plate is die cast around the cable end to integrally capture said cable end therein.

30. The combination of claim 28 wherein the cable end includes an arcuate portion extending about the axis of rotation of the sheave assembly.

31. The combination of claim 30 wherein the arcuate portion of the cable end includes kinks along its length.

32. The combination of claim 30 wherein the arcuate portion of the cable end terminates in a flattened head portion.

33. The combination of claim 32 wherein the arcuate portion and flattened head portion of the cable end form a restrained shoulder therebetween.

34. The combination of claim 33 wherein the center plate includes a complementary restraining shoulder in opposing, abutting relation to the restrained shoulder to restrain movement of the flattened head portion when the cable is under tension.

35. A method for making a sheave plate and cable assembly comprising placing a length of the cable in a mold cavity shaped complementary to the shape of the sheave plate and introducing molding material into the mold cavity to so mold the sheave plate around the length of the cable as to form a unitary sheave plate and cable assembly and anchor said length in the sheave plate against pull-out forces when the cable is under tension.

36. The method of claim 35 including molding the thickness of the sheave plate greater than the thickness of the cable captured in the sheave plate.

37. The method of claim 35 including forming a portion of said length into an arcuate configuration.

38. The method of claim 37 including forming kinks in the arcuate configuration.

39. The method of claim 37 including flattening a portion of said length to form an elongate head at the end of the arcuate portion.

40. The method of claim 35 including introducing molten metal into the mold cavity to die cast the sheave plate around the cable end.

* * * * *

UNITED STATES PATENT AND TRADEMARK OFFICE
CERTIFICATE OF CORRECTION

PATENT NO. : 5,110,093

DATED : May 5, 1992

INVENTOR(S) : Rempinski et al.

It is certified that error appears in the above-identified patent and that said Letters Patent is hereby corrected as shown below:

Column 1, line 47, after "rotated" insert -- . --.

Column 1, line 68, after "end" insert -- is --.

Signed and Sealed this

Twenty-second Day of November, 1994

Attest:

BRUCE LEHMAN

Attesting Officer

Commissioner of Patents and Trademarks